(12) United States Patent
Crorey

(10) Patent No.: US 6,199,846 B1
(45) Date of Patent: Mar. 13, 2001

(54) ELECTRIC POWER OPERATED CLAMP WITH SPRING LOCK

(75) Inventor: David J. Crorey, Clinton Township, MI (US)

(73) Assignee: ISI Norgren, Inc., Clinton Township, MI (US)

( * ) Notice: Subject to any disclaimer, the term of this patent is extended or adjusted under 35 U.S.C. 154(b) by 0 days.

(21) Appl. No.: 09/140,172

(22) Filed: Aug. 26, 1998

Related U.S. Application Data

(63) Continuation-in-part of application No. 09/067,203, filed on Apr. 28, 1998, now Pat. No. 6,003,850.

(51) Int. Cl.$^7$ ...................................................... B23Q 3/03
(52) U.S. Cl. ............................ 269/32; 269/233; 269/235
(58) Field of Search ........................... 74/55, 25; 269/32, 269/228, 233, 93, 94, 235

(56) References Cited

U.S. PATENT DOCUMENTS

| | | |
|---|---|---|
| 3,599,957 | 8/1971 | Blatt . |
| 4,459,945 * | 7/1984 | Chatfield ................................. 74/55 |
| 4,494,739 | 1/1985 | Valentine . |
| 4,723,767 | 2/1988 | McPherson et al. . |

* cited by examiner

*Primary Examiner*—Robert C. Watson
(74) *Attorney, Agent, or Firm*—Young & Basile, P.C.

(57) ABSTRACT

A clamping apparatus includes a housing and a pivot pin mounted for pivoting movement about an axis of rotation with respect to the housing. A clamp member is connected to the pivot pin and is moveable between a clamped position and a released position in response to rotation of the pivot pin. The pivot pin has an arm extending radially outwardly from the axis of rotation. A drive member is mounted for linear reciprocal movement along a fixed path with respect to the housing, and a linkage connects the drive member to the arm of the pivot pin for converting reciprocal movement of the drive member into pivoting movement of the pivot pin. An electric motor is connected to an output shaft with an axis of rotation, and an adjustable converting mechanism connects the drive member to the electric motor for adjustably converting the rotary motion driving force into a linear reciprocal harmonic motion of the drive member. The adjustable converting mechanism allows the stroke of the linear reciprocal motion to be adjusted. In addition, an automatic adjusting mechanism allows the drive member to adjust its length in response to the driving force of the electric motor and the position of the clamp member.

17 Claims, 5 Drawing Sheets

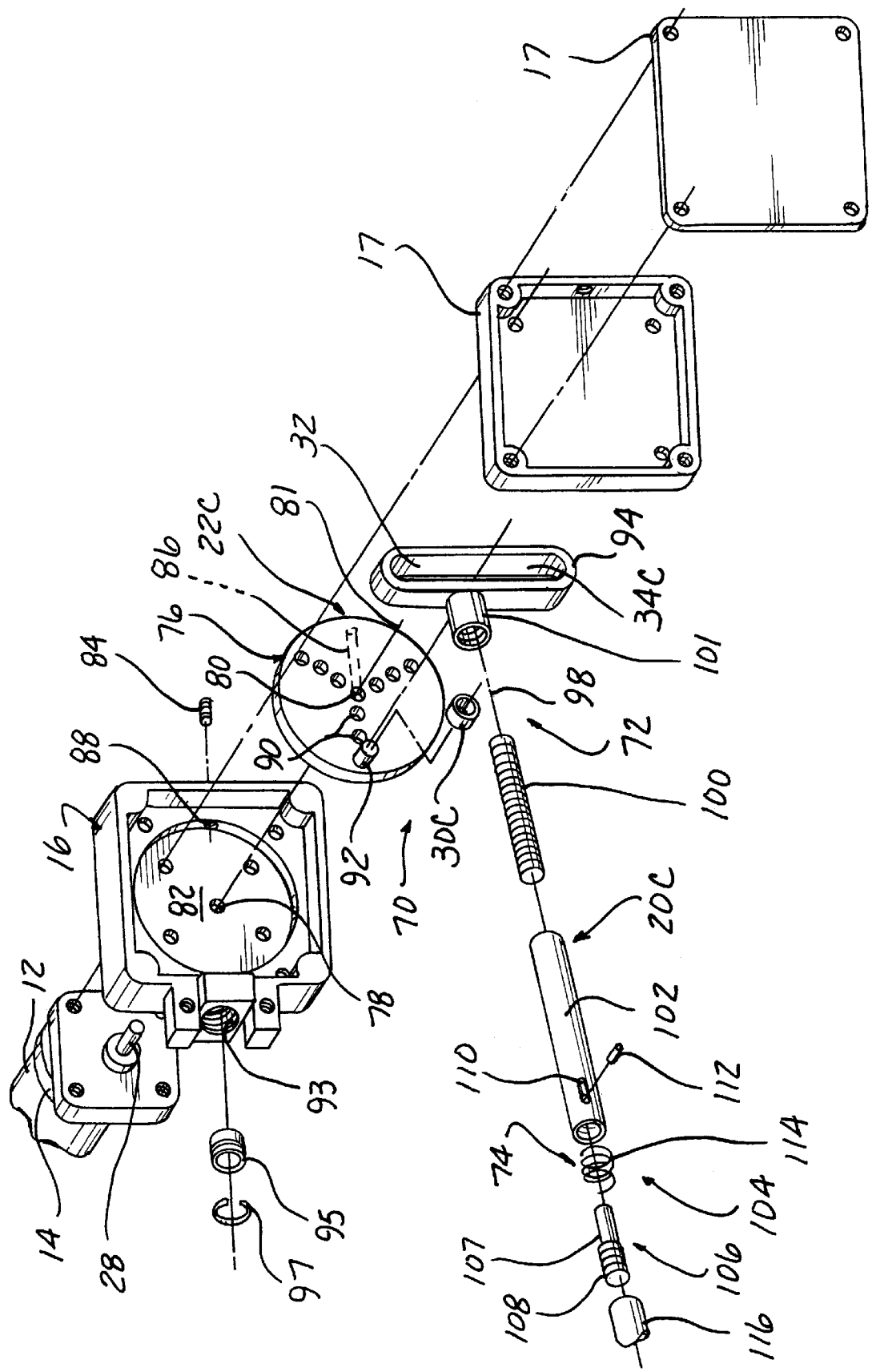

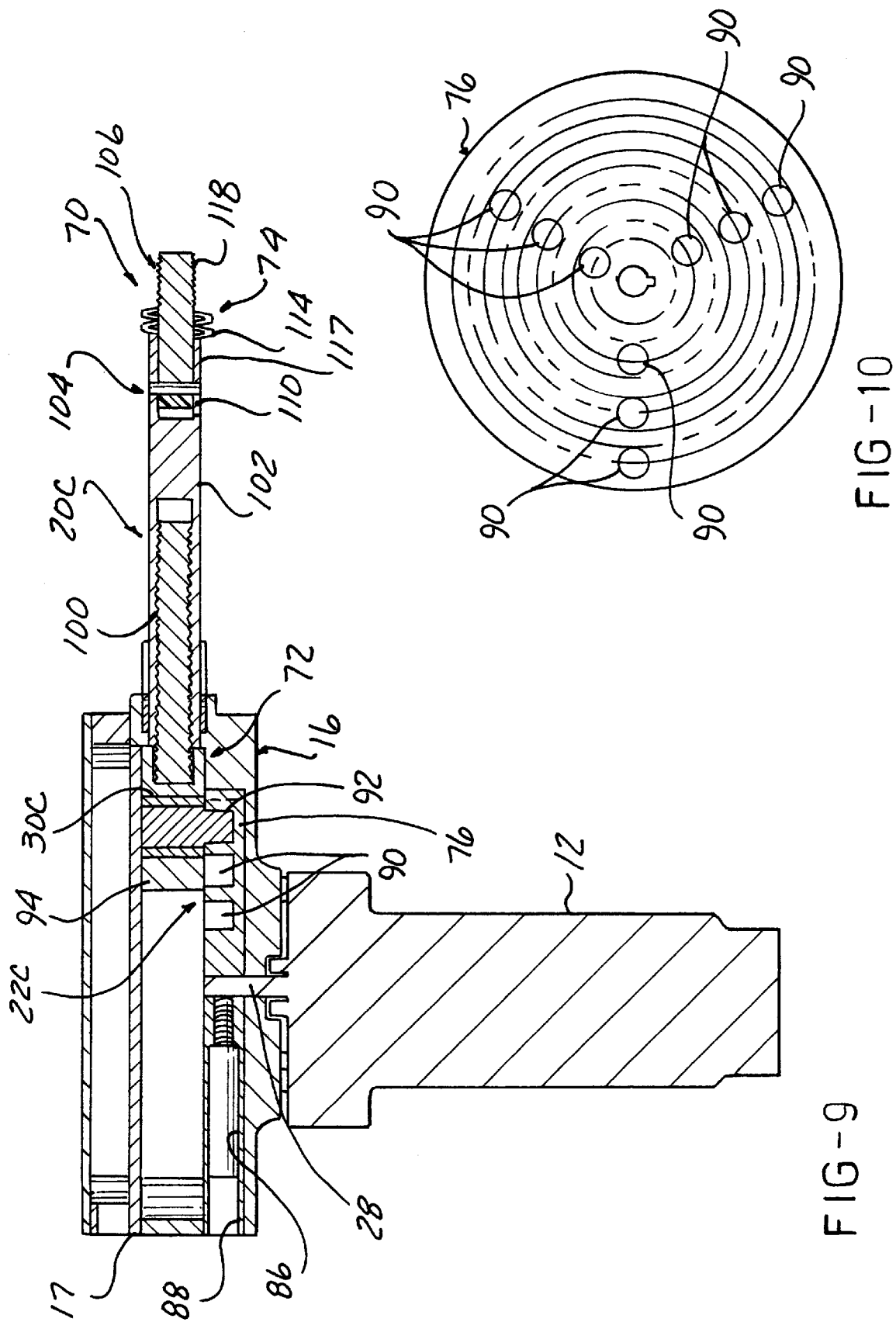

ELECTRIC POWER OPERATED CLAMP WITH SPRING LOCK

The following patent application is a continuation-in-part U.S. patent application Ser. No. 09/067,203 filed on Apr. 28, 1998 and now issued as U.S. Pat. No. 6,003,850.

FIELD OF THE INVENTION

The present invention relates to an electric power operated clamp for moving at least one clamp arm between a clamped position and a released position, and in particular, an adjustable mechanism that converts the rotary motion of an electric power source into linear reciprocal movement of a drive member and then into rotary motion of the clamp arm.

BACKGROUND OF THE INVENTION

Various clamping devices have been provided for immovably securing a workpiece or workpieces with respect to a stationary support during a machining and/or welding operation. Most of these devices have incorporated fluid operated actuators, such as hydraulic or pneumatic operated piston and cylinder actuators. While these devices are satisfactory for clamping workpieces to a stationary support, difficulties arise in using clamps of this configuration for use in non-stationary support situations, such as moving transfer devices, conveyors, shuttles or the like. In addition, the use of hydraulic fluid in non-stationary applications can be the source of hydraulic fluid leaks, while the use of pneumatic actuators increases cost of operation by requiring the production of sufficient quantities of compressed air of predefined quality for operating clamping devices. Compressed air generally requires the use of fixed or flexible conduits to communicate the compressed air with the actuator, and may produce compressed air leaks increasing operating costs. Furthermore, it is difficult to obtain a harmonic motion clamp action with a hydraulic or pneumatic actuator, sometimes referred to as a "soft-touch" clamp, where the clamp decelerates adjacent the clamped and/or released position thereby eliminating the need for "bumpers" or other shock absorbing elements. Typically, hydraulic and pneumatic actuated clamps require complex control mechanisms to adjust the rate of actuation of the clamp to eliminate or reduce the amount of shock absorbed as the clamp reaches the clamped position and/or the released position.

SUMMARY OF THE INVENTION

It is desirable in the present invention to provide an electric power operated clamp to eliminate the recognized deficiencies in hydraulic and/or pneumatic operated clamps. In addition, it is desirable in the present invention to provide an electric power operated clamp having harmonic clamp motion, where the clamp decelerates as it approaches the clamped position and/or released position. The present invention provides a power operated clamp including an electric motor means for imparting a rotary motion driving force. A drive member is operably associated with the electric motor means. First converting means connects the drive member to the electric motor means. The first converting means converts the rotary motion driving force of the electric motor means into a linear reciprocal motion of the drive member. A clamp member is operably associated with the drive member. Second converting means connects the clamp member to the drive member. The second converting means converts the linear reciprocal motion of the drive member into rotary motion of the clamp arm to move the clamp member between a clamped position and a released position.

In the first configuration, the first converting means includes an elongate arm connected to a shaft of the electric motor means which extends radially outward for rotation with the shaft. A cam follower is connected to the elongate arm spaced radially from the shaft. The drive member is mounted for linear reciprocal movement along a fixed path. The drive member has a cam surface defining a slot adjacent one longitudinal end of the elongate drive member. The slot extends generally normal to the fixed path of the drive member. The cam follower operably engages within the slot for converting the rotational movement of the cam follower into linear movement of the drive member.

In an alternative configuration, the first converting means can include an eccentric member connected to the electric motor means for rotation therewith and having an external periphery. The drive member can include a connecting rod and slide block. The connecting rod has a complementary aperture formed therein for operably receiving the external periphery of the eccentric member. The connecting rod also includes a pivot pin for operably connecting to the slide block, such that the slide block is driven in reciprocal motion by the connecting rod in response to rotation of the eccentric member.

Another alternative embodiment can include the first converting means having a barrel cam connected to the electric motor means for rotation therewith. The barrel cam has a generally helical cam surface formed on an external periphery. The drive member has an aperture for receiving the barrel cam. A cam follower is supported by the drive member and is engageable with the cam surface for driving the drive member in linear motion in response to rotary motion of the barrel cam. Preferably, the generally helical cam surface is formed having reduced longitudinal spacing between turns adjacent one or both longitudinal ends to impart a harmonic motion to the clamp arm while approaching the respective end limit of movement corresponding to the clamped position and the released position.

In the preferred embodiment, the present invention provides an adjustable converting means for converting the rotary motion of the power means into linear reciprocal motion of the drive member. The adjustable converting means includes the first converting means having a crank arm connected to the power means and extending radially outward for rotation about an axis of rotation. The follower is connected to the crank arm and spaced radially from the axis of rotation. The drive member is mounted for reciprocal movement along a fixed path wherein the cam surface of the drive member defines the slot. The follower operably engages the slot to convert the rotational movement of the follower into linear movement of the drive member. The second converting means converts the linear reciprocal motion of the drive member into rotary motion of the clamp member.

A manual adjustment means is also provided in the preferred embodiment for adjusting the stroke of the linear reciprocal motion of the drive member. The manual adjustment means provides the crank arm with a plurality of apertures radially spaced from the axis of rotation wherein the follower is removably inserted in at least one of the apertures of the crank arm. The drive member includes a threaded rod and an outer shaft wherein the outer shaft threadingly receives the rod. The outer shaft and the rod threadingly adjust along the longitudinal axis of the drive member to adjust the length of the drive member in response to the position of the follower in the crank arm.

The preferred embodiment also provides an automatic adjustment means to automatically adjust the length of the drive member in response to the driving force of the power means and the position of the clamp member. The automatic adjustment means provides the drive member with a telescopic portion telescopically moveable along the longitudinal axis of the drive member between an extended position and a contracted position. A positive stop limits the telescopic movement of the telescopic portion between the extended position and the contracted position. At least one compression spring biases the telescopic portion of the drive member toward the extended position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 8 is an exploded view of the drive member of the present invention;

FIG. 9 is a sectional view taken in the direction of arrows 9—9 in FIG. 7; and

FIG. 10 is a plan view of the crank arm.

DESCRIPTION OF THE PREFERRED AND ALTERNATIVE EMBODIMENTS

Figure 1:
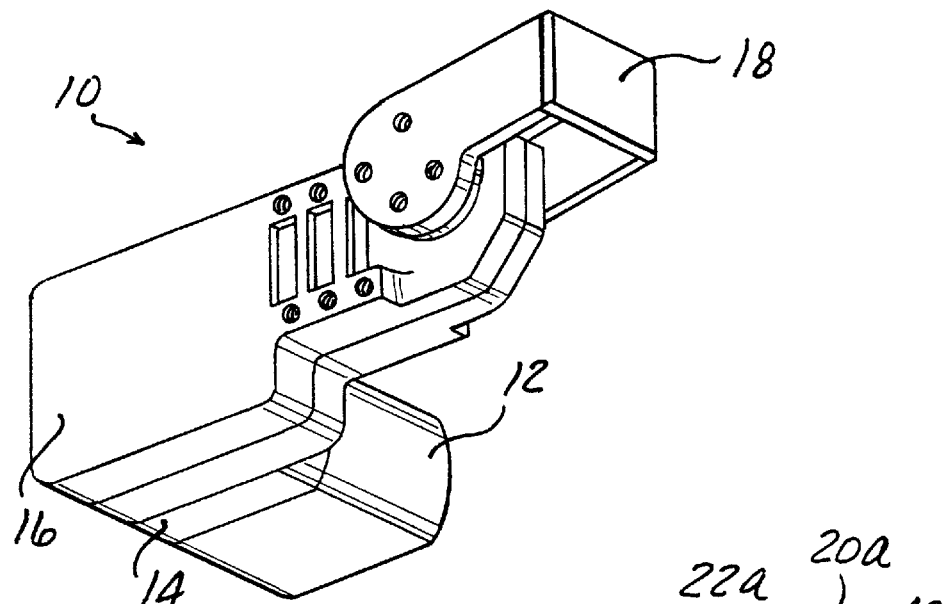
FIG. 1 is a perspective view of an electric power operated clamp according to the present invention.

A power operated clamp 10 is illustrated in perspective view in FIG. 1. The power operated clamp 10 includes an electric motor means 12 for imparting a rotary motion driving force to the clamp assembly. A gear box 14 can be provided, if required, between the electric motor means 12 and the clamp actuator housing 16. A clamp member 18 is operably associated with the housing 16 for movement between a clamped position and a released position.

Figure 3:
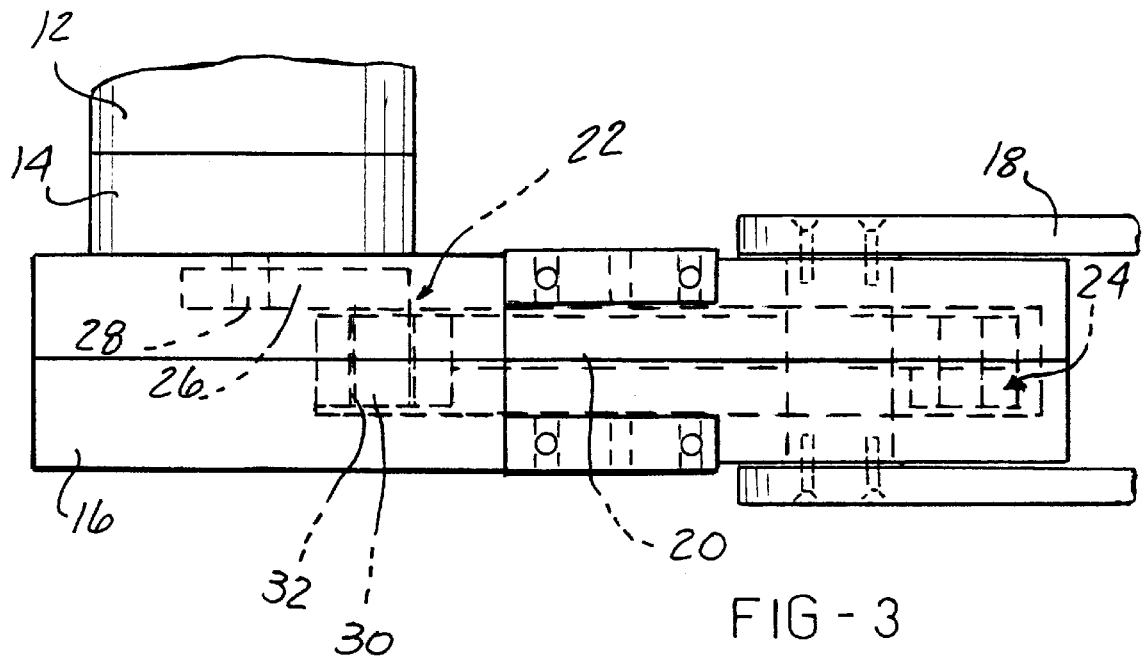
FIG. 3 is a top view of the electric power operated clamp illustrated in FIG. 2 with the housing in place enclosing the internal mechanism.
Figure 2:
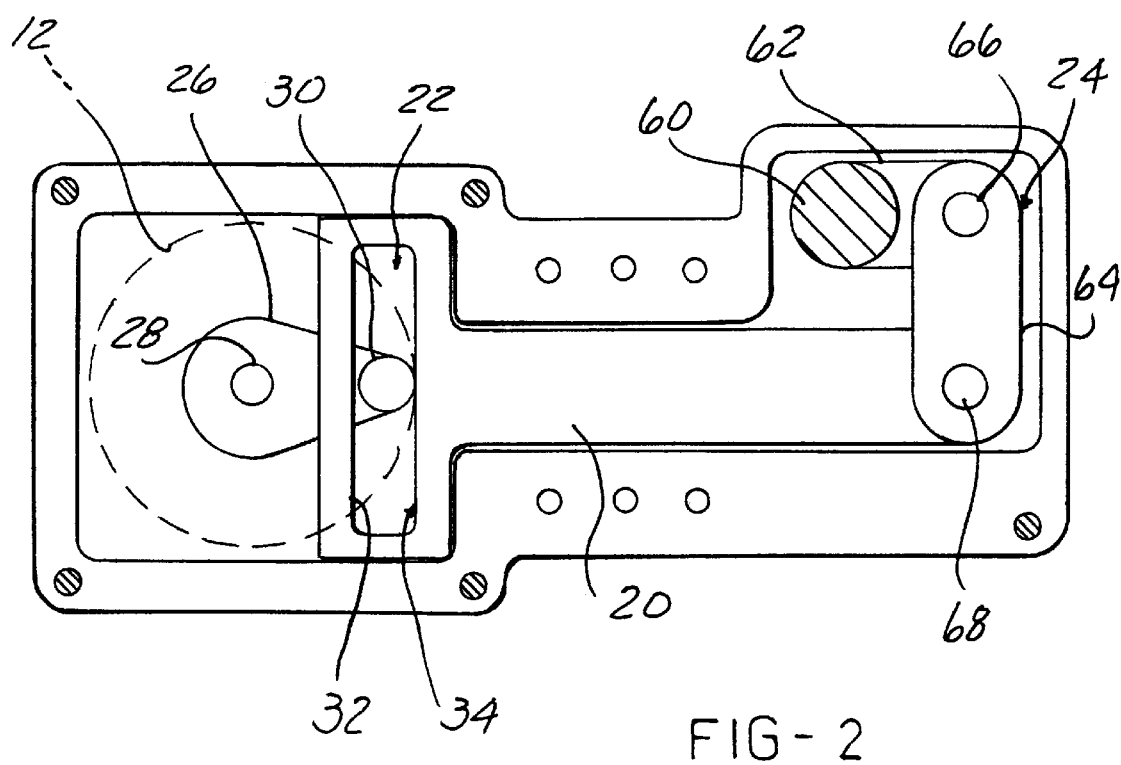
FIG. 2 is a simplified internal view of the clamp with one half of the housing removed in order to show the internal mechanism.
Figure 6:
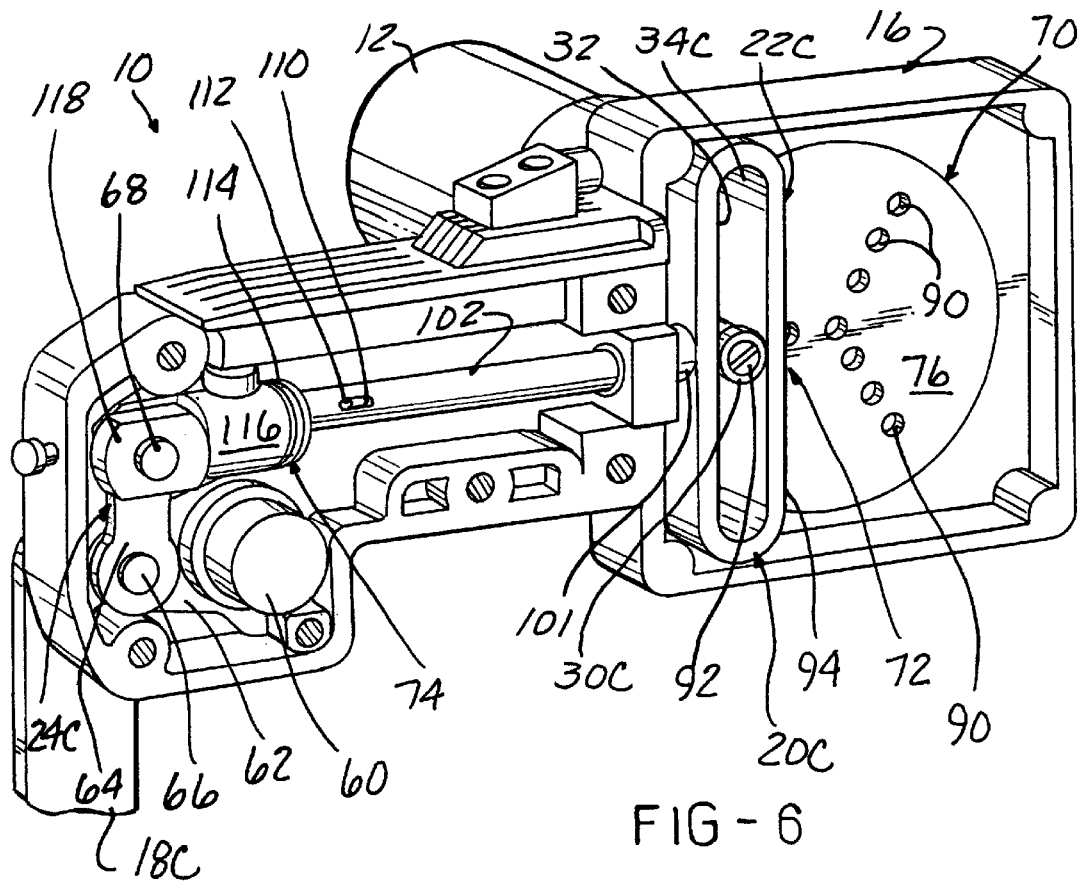
FIG. 6 is a perspective cut away view of an electric power operated clamp according to the present invention.
Figure 7:
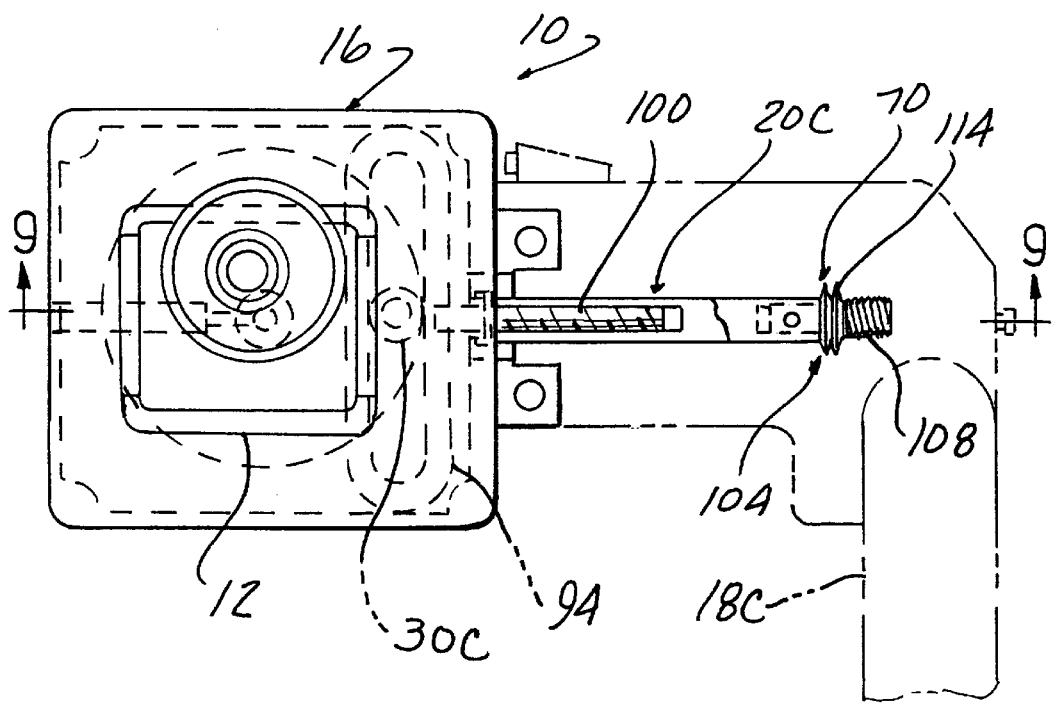
FIG. 7 is a front view of the power means and the drive member of the present invention.

Referring now to FIGS. 2 and 3, a drive member 20 is operably associated with the electric motor means 12. First converting means 22 connects the drive member 20 to the electric motor means 12. The first converting means 22 is for converting the rotary motion driving force of the electric motor means 12 into a linear reciprocal motion of the drive member 20. Second converting means 24 connects the clamp member 18 to the drive member 20. The second converting means 24 is for converting the linear reciprocal motion of the drive member 20 into rotary motion of the clamp member 18 to move the clamp member 18 between a clamped position and a released position.

In the embodiment depicted in FIGS. 2 and 3, the first converting means 22 can include an elongate arm 26 connected to an output shaft 28 of the electric motor means 12. The elongate arm 26 extends radially outward for rotation with the shaft 28. A follower 30 is connected to the elongate arm 26 and is spaced radially from the longitudinal axis of the shaft 28. The drive member 20 is mounted for linear reciprocal movement along a fixed path and has a cam surface 32 adjacent one longitudinal end of the elongate drive member 20. Preferably, the cam surface 32 defines a slot 34, and more preferably, the slot 34 extends generally normal to the fixed path of travel for the drive member 20. The follower 30 operably engages within the slot 34 for converting the rotational movement of the follower 30 into linear movement of the drive member 20. In the preferred configuration illustrated in FIGS. 2 and 3, the slot 34 is linear and generally perpendicular to the fixed path of the drive member 20. This configuration provides the desired harmonic motion clamp action.

Figure 4:
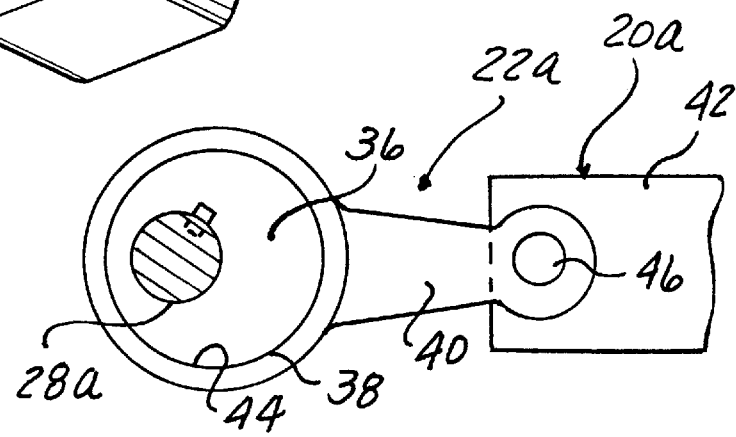
FIG. 4 is a simplified schematic view of an alternative embodiment of first converting means for converting the rotary motion driving force of the electric motor means into a linear reciprocal motion of a drive member according to the present invention.

An alternative configuration of the first converting means 22a is illustrated in FIG. 4. In this configuration, an eccentric member 36 is connected to the shaft 28a of the electric motor means for rotation therewith. The eccentric member 36 has an external periphery 38. In this embodiment, the drive member 20a includes a connecting rod 40 and a slide block 42. The connecting rod 40 has a complementary aperture 44 formed therein for operably receiving the external periphery 38 of the eccentric member 36. The connecting rod 40 also includes a pivot point or pin 46 for operably connecting the connecting rod 40 to the slide block 42. The slide block 42 is driven in reciprocal motion by the connecting rod 40 in response to rotation of the eccentric member 36. This configuration for the first converting means 22a also provides the desirable harmonic motion clamp action, sometimes referred to as a "soft-touch" clamp. In this respect, both the embodiment depicted in FIGS. 2 and 3, and the alternative configuration of the first converting means 22a of FIG. 4 provide a clamp that decelerates adjacent the clamped position and the released position, while achieving maximum acceleration generally midway between the clamped position and released position. This configuration eliminates the need for "bumpers" or other shock absorbing elements at the end limit of movement of the clamp.

Figure 5:
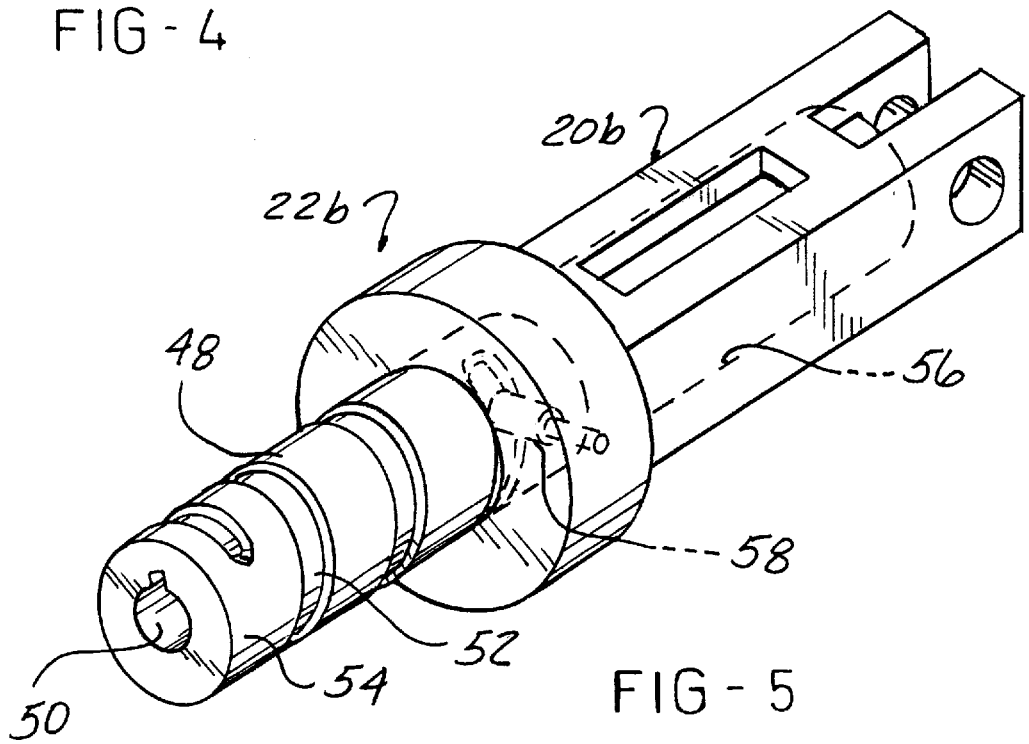
FIG. 5 is a simplified schematic view of an alternative embodiment of the first converting means.

Another alternative configuration for the first converting means 22b is illustrated in FIG. 5. In this embodiment, the first converting means 22b includes a barrel cam 48. The barrel cam 48 includes an aperture 50 for receiving an output shaft of the electric motor means, so that the barrel cam 48 is driven in rotation in response to rotation of the shaft of the electric motor means. The barrel cam 48 includes a generally helical cam surface 52 formed on an external periphery 54. The drive member 20b includes an aperture 56 for receiving the barrel cam 48. A cam follower 58 is supported by the drive member 20b and is engagable with the cam surface 52 for driving the drive member 20b in linear motion in response to rotary motion of the barrel cam 48. Preferably, the generally helical cam surface 52 is formed having reduced longitudinal spacing between turns adjacent one or both longitudinal ends of the barrel cam 48 to impart a harmonic motion to the clamp member 18 while approaching one or both end limits of movement corresponding to either or both of the clamped position and the released position. This embodiment also provides the first converting means 22 with the desirable harmonic motion driving force provided in the previously described embodiments.

Referring now to FIG. 2, the second converting means 24 can include a pivot pin 60 operably connected to the clamp member 18 for moving the clamp member 18 between a released position and a clamped position about a rotational axis. The pivot pin 60 has a radially extending arm 62. An elongate link 64 has a first pivot connection 66 to the radially extending arm 62 of the pivot pin 60 and a second pivot connection 68 to the drive member 20, 20a, or 20b opposite from the first converting means 22, 22a, or 22b. For purposes of illustration and not limitation, the second converting means 24 can be similar in construction for each of the alternative embodiments discussed in detail above. Preferably, the second converting means 24 converts the harmonic linear reciprocal motion of the drive member 20, 20a, or 20b into rotational harmonic motion, or "soft-touch" motion of the clamp member 18 as it approaches one or both end limits of travel.

In the configuration illustrated in FIGS. 1–3, the power operated clamp 10 includes an electric motor connected to an output shaft with a longitudinal axis. The shaft can be connected to the first converting means 22, 22a, or 22b, directly or through a gear box 14 as appropriate for the particular power operated clamp. An elongate arm 26 is connected to the shaft 28 and extends radially outwardly from the longitudinal axis for rotation with the shaft 28. A follower 30 is connected to the elongate arm 26 and is spaced radially from the longitudinal axis of the shaft. A housing 16 at least partially encloses the elongate arm 26 and follower 30. An elongate drive member 20 is mounted for linear reciprocal movement along a fixed path with respect to the housing 16. The drive member 20 has a cam surface 32 defining a linear slot 34 adjacent one longitudinal end of the elongate drive member 20. The slot 34 preferably extends normal to the fixed path of reciprocal movement for the drive member 20. The follower 30 operably engages within the slot 34 for converting the rotational movement of the follower 30 into linear movement of the drive member 20. At least one elongate link member 64 is pivotally connected to a longitudinal end of the drive member 20 opposite from the slot 34. A pivot pin 60 includes an arm 62 connected thereto for rotational movement therewith. The pin 60 is supported in the housing 16 for rotation with respect to the housing 16. The arm 62 is pivotally connected to the link member 64 for converting linear movement of the elongate drive member 20 into rotational movement of the pivot pin 60 through the link member 64. A clamp member 18 is connected to the pivot pin 60 for movement between a clamped position and a released position in response to movement of the drive member 20 operably engaging the follower 30 driven by the electric motor 12.

In one embodiment, the first converting mechanism includes a elongate arm driven by the rotatable shaft of the electric motor and extending radially outwardly with a follower connected to the elongate arm spaced from the axis of rotation. A cam surface is formed on the drive member and is engaged by the follower for driving the drive member in reciprocal linear harmonic motion in response to rotation of the shaft. In a second embodiment, the first converting mechanism includes an eccentric member connected to the shaft driven by the electric motor and the drive member including a connecting rod and slide block, where the connecting rod has a complementary aperture for operably receiving the internal periphery of the eccentric member and a pivot point for operably connecting to the slide block, so that the slide block is driven in reciprocal linear harmonic motion by the connecting rod in response to rotation of the eccentric member. In a third embodiment, the first converting mechanism includes a barrel cam connected to the shaft driven by the electric motor for rotation. The barrel cam has a generally helical cam surface formed on an external periphery, and the drive member has an aperture for receiving the barrel cam. The cam follower is supported by the drive member and is engageable with the cam surface for driving the drive member in reciprocal linear harmonic motion in response to rotary motion of the barrel cam.

In the preferred embodiment illustrated in FIGS. 6–10, the power operated clamp 10 includes the electric motor means 12 for imparting a rotary motion driving force to the clamp assembly. As previously noted, the electric motor means 12 may be utilized in conjunction with the gear box 14 in order to provide the desired torque and speed characteristics of the power clamp 10. Although the present invention is best suited for use with an electric motor as the power means, any number of power sources may be utilized which render the characteristics associated with an electric motor. The electric motor means 12 is connected to the clamp actuator housing 16, and the housing 16 has a cover assembly 17 for enclosing the housing 16. The clamp member 18c is operably associated with the housing 16 for movement between the clamped position and the released position.

As seen in FIGS. 6–9, the drive member 20c is operably associated with the electric power means 12. An adjustable converting means 70 converts the rotary motion of the electric power means 12 into linear reciprocal motion of the drive member 20c. The adjustable converting means 70 includes the first converting means 22c which connects the drive member 20c to the electric motor means 12. The first converting means 22c converts the rotary motion driving force of the electric motor means 12 into a linear reciprocal motion of the drive member 20c. The second converting means 24c connects the clamp member 18c to the drive member 20c. The second converting means 24c is for converting the linear reciprocal motion of the drive member 20c into rotary motion of the clamp member 18c and to move the clamp member 18c between the clamped position and the released position. The adjustable converting means 70 also includes a manual adjusting means 72 for adjusting the stroke of the linear reciprocal motion of the drive member 20c and an automatic adjusting means 74 for automatically adjusting the length of the drive member 20c in response to the driving force of the electric power means 12 and the position of the clamp member 18c.

To convert the rotary motion of the electric power means 12 into linear reciprocal motion of the drive member 20c, the first converting means 22c may include a crank arm 76 connected to the output shaft 28 of the electric motor means 12. The electric motor means 12 is connected to the clamp actuator housing 16, and the output shaft 28 of the electric motor means 12 extends through an aperture 78 provided in the clamp actuator housing 16. The crank arm 76 has a disk shaped configuration having an aperture 80 extending therethrough along the centerline axis 81 of the crank arm 76 for receiving the output shaft 28 of the electric motor means 12. The clamp actuator housing 16 has a recessed portion 82 for receiving the disk shaped crank arm 76. A set screw 84 extends through a radially extending aperture 86 provided in the crank arm 76 to secure the crank arm 76 to the output shaft 28 of the electric motor means 12. A corresponding aperture 88 is provided in the clamp actuator housing 16 to access the set screw 84 from outside the clamp actuator housing 16.

The crank arm 76 is connected to the drive member 20c by the follower or roller 30c. The follower 30c is rollably mounted to a roller shaft 92 which is inserted into a corresponding aperture 90 provided in the crank arm 76. The aperture 90 is one of a plurality of apertures 90 which are radially spaced from the longitudinal axis 81 of the drive shaft 28 and which will be described in detail later. The drive member 20c is mounted for linear reciprocal movement along a fixed path wherein a bore 93 extending through a portion of the housing 16 slidingly receives the drive member 20c. A bushing 95 lines the bore 93 and is retained by a retaining clip 97. A cam bar 94 is adjacent one longitudinal end of the drive member 20c for operably engaging the follower 30c. The cam bar 94 provides a cam surface 32 which defines a linear slot 34c for receiving the follower 30c. The slot 34c extends substantially normal to the fixed path of travel for the drive member 20c. This configuration provides the desired harmonic motion clamp action, previously referred to as a "soft-touch" clamp. In this regard, the clamp member 18c decelerates adjacent the clamp position and the released position, while achieving maximum acceleration generally midway between the clamped position and the released position.

To manually adjust the stroke of the linear reciprocal motion of the drive member 20c, the crank arm 76 provides the plurality of radially spaced apertures 90, as seen in FIG. 10. To lengthen the stroke of the linear reciprocal motion of the drive member 20c and correspondingly expand the rotary motion of the clamp member 18c, the follower 30c is moved radially outward toward an outwardly extending aperture 90 in the crank arm 76. To shorten or contract the stroke of the linear reciprocal motion of the drive member 20c and correspondingly reduce the rotary motion of the clamp member 18c, the follower 30c is moved radially inward toward an inwardly extending aperture 90 in the crank arm 76. The radial distance of the follower 30c translates the rotational movement of the crank arm 76 into linear motion of the follower 30c in the slot 34c of the cam bar 94 of the drive member 20c.

To correspondingly adjust the length of the drive member 20c to the stroke of the linear reciprocal motion of the drive member 20c, the drive member 20e has a threaded rod 100 having opposite ends, wherein one end threadingly engages a threaded tubular portion 101 of the cam bar 94, and the opposite end threadingly engages an outer shaft 102 of the drive member 20c. By threadingly engaging and adjusting the outer shaft 102 with the threaded rod 100, the length of the drive member 20c may be adjusted to correspond with the adjusted stroke of the linear reciprocal motion of the drive member 20c.

To automatically adjust the length of the drive member 20c in response to the driving force of the electric power means 12 and the position of the clamp member 18c, the drive member 20c provides a telescopic portion 104 having the outer shaft 102 telescopically receive a connector sleeve or inner shaft 106. The connector sleeve 106 has a smooth cylindrical configuration 107 at one end and a larger cylindrical, threaded portion 108 at its other end. The smooth cylindrical portion 107 of the connector sleeve 106 is telescopically received by the tubular cylindrical configuration of the outer shaft 102. The threaded portion 108 of the connector sleeve 106 does not extend into the outer shaft 102. The telescopic relationship of the outer shaft 102 and the connector sleeve 106 is maintained by the outer shaft 102 having a slot 110 extending through a wall of the outer shaft 102. The connector sleeve 106 has an aperture extending through the smooth cylindrical portion 107 of the connector sleeve 106 and coaxially aligned with the slot 110 in the outer shaft 102. A holding pin 112 extends through the slot 110 and into the aperture provided in the connector sleeve 106. The holding pin 112 limits the telescopic movement of the drive member 20c by abuting the portions of the outer shaft 102 defining the ends of the slot 110 when the connector sleeve 106 telescopically slides within the outer shaft 102 of the drive member 20c between the extended position and the contracted position of the drive member 20c.

To bias the telescopic portion 104 toward the extended position, at least one compression spring 114 is mounted between the outer shaft 102 and the connector sleeve 106 of the drive member 20c. The spring 114 has a compressive spring force equal to a desired clamping force of the clamp member 18c. When the clamp member 18c moves into the clamped position, the crank arm 76 may continue to drive the drive member 20c against the clamp member 18c so that the telescopic portion 104 compresses, and the spring force of the spring 114 applies a constant force to the clamp member 18c. The spring 114 essentially locks the clamp member 18c into the clamped position until the crank arm 76 drives the drive member 20c toward the released position.

The second converting means may include one end of a rod end 116 threadingly connected to the threaded portion 108 of the connector sleeve 106. The opposite end of the rod end 116 includes a slot (not shown) defined by two opposed protruding portions 118 of the rod end 116. A pair of coaxial apertures having a common axis extend through the protruding portions 118 of the rod end 116. The elongate link 64 is pivotally connected to the rod end 116 by pivot connection 68 extending through the apertures in the protruding portions 118 of the rod end 116 and through one aperture in the elongate link 64. The opposite end of the elongate link 64 is pivotally connected to the radially extending arm 62 of the pivot pin 60 by pivot connection 66. The pivot pin 60 is operably connected to the clamp member 18c for moving the clamp member 18c between the released position and the clamped position.

In operation, the electric power means 12 of the power clamp 10 is actuated to impart rotary motion to the output shaft 28. The output shaft 28 rotates the crank arm 76 thus rolling the follower 30c along the slot 34c provided in the cam bar 94 of the drive member 20c. The rotational movement of the crank arm 76 imparts a linear reciprocal harmonic motion to drive member 20c along its longitudinal axis 98. The linear reciprocal harmonic motion of the drive member 20c is transferred to the second converting means 24c and transformed into harmonic rotary motion of the clamp member 18c.

To adjust the stroke of the linear reciprocal harmonic motion of the drive member 20c, the roller shaft 92 is inserted into one of the radially spaced apertures 90 in the crank arm 76. The further the follower 30c is radially spaced from the output shaft 28, the longer the stroke of the linear reciprocal motion. Since the clamp assembly is stationarily positioned, the length of the drive member 20c must be manually adjusted to compensate for the stroke of the linear actuator motion. The threaded rod 100 is threadingly adjusted within the outer shaft 102 of the drive member 20c to correlate and complement the stroke of the linear reciprocal motion of the drive member 20c.

When the power clamp 10 reaches the clamped position, the position of the follower 30c is preferably approaching the longitudinal axis 98 of the drive member 20c. In the clamped position, the pivot pin 60 typically engages a positive stop to prevent the clamp member 18c from extending beyond the clamped position, and thus, the electric power means 12 increases the driving force of the drive member 20c against the clamp member 18c. In response to the driving force of the electric power means 12 and the clamp member 18c in the clamped position, the telescopic portion 104 of the drive member 20c contracts against the spring force provided by spring 114, and the holding pin 112 moves within the slot 110 as the outer shaft 102 telescopically slides relative to the connector sleeve 106. As the follower 30c approaches, reaches, and extends just beyond the longitudinal axis 98 of the drive member 20c such that the clamp member 18c remains in the clamped position, the spring force of spring 114 applies a constant spring force against clamp member 18c thus locking the clamp member 18c in the clamped position. Once the follower 30c travels far enough towards the released position to release the clamp member 18c from the clamped position, the spring 114 biases the telescopic portion 104 of the drive member 20c towards the expanded position, and the holding pin 112 moves back relative to the slot 110. As previously noted, the holding pin 112 engages the ends of the slot 110 provided in the outer shaft 102 of the drive member 20c to define the contracted and extended positions of the telescopic portion 104 of drive member 20c. The crank arm 76 continues to rotate thus bringing the clamp member 18c to the released position and then back toward the clamped position.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A power operated clamp comprising:
    power means for imparting a rotary motion driving force;
    a drive member operably associated with said power means;
    a clamp member operably associated with said drive member for moving said clamp member between a clamped position and a released position;
    adjustable means for converting said rotary motion of said power means into a linear reciprocal motion of said drive member wherein said adjustable converting means comprises means for automatically adjusting the length of said drive member in response to the driving force of said power means and the position of said clamp member;
    said automatic adjusting means comprises:
        said drive member having a telescopic portion telescopically movable along a longitudinal axis between an extended position and a contracted position;
        a positive stop for limiting the telescopic movement of said telescopic portion between said extended position and said contracted position; and
        at least one spring biasing said telescopic portion toward said extended position.

2. The power operated clamp stated in claim 1, wherein said positive stop comprises:
    said telescopic portion having an outer shaft and an inner shaft;
    a pin connected to either one of said inner shaft and said outer shaft; and
    a slot formed in the other of said outer shaft and said inner shaft, and said slot receiving said pin for defining said telescopic movement of said telescopic portion between said extended position and said contracted position.

3. A power operated clamp comprising:
    power means for imparting a rotary motion driving force;
    a drive member operably associated with said power means;
    a clamp member operably associated with said drive member for moving said clamp member between a clamped position and a released position;
    adjustable means for converting said rotary motion of said power means into a linear reciprocal motion of said drive member wherein said adjustable converting means comprises:
        a crank arm connected to said power means and extending radially outward for rotation about an axis of rotation;
        a follower connected to said crank arm; and
        said drive member mounted for linear reciprocal movement along a fixed path, said drive member having a cam surface defining a slot, and said follower operably engageable within said slot for converting the rotational movement of said follower into linear movement of said drive member; and
    manual means for adjusting the stroke of said linear reciprocal motion of said drive member.

4. The power operated clamp stated in claim 3, further comprising:
    said crank arm having a plurality of apertures radially spaced from said axis of rotation; and
    said follower removably inserted in at least one of said apertures of said crank arm.

5. A power operated clamp comprising:
    electrical power means for imparting a rotational driving force;
    a drive member operably associated with said electric power means;
    first converting means, connecting the drive member to said electric power means, for converting said rotational driving force into a linear reciprocal motion of said drive member;
    a clamp member operably associated with said drive member for moving said clamp member between a clamped position and a released position;
    said drive member having means for automatically adjusting the length of said drive member in response to said driving force of said electric power means and the position of said clamp member wherein said automatic adjusting means comprises:
        said drive member having an outer shaft and an inner shaft wherein said outer shaft telescopically receives said inner shaft for telescopic movement of said inner shaft relative to said outer shaft between an extended position and a contracted position;
        a positive stop for limiting telescopic movement of said drive member between said extended position and said contracted position; and
        and at least one compression spring operably connected to said outer shaft and said inner shaft for biasing said drive member toward said extended position.

6. The power operated clamp stated in claim 5, wherein said positive stop comprises:

a pin connected to one of either said outer shaft and said inner shaft of said drive member; and a slot formed in the other of said outer shaft and said inner shaft, and said slot receiving said pin and defining said extended and contracted positions by said pin engaging the ends of said slot.

7. A power operated clamp comprising:

electrical power means for imparting a rotational driving force;

a drive member operably associated with said electric power means;

first converting means, connecting the drive member to said electrical power means, for converting said rotational driving force into a linear reciprocal motion of said drive member;

a clamp member operably associated with said drive member for moving said clamp member between a clamped position and a released position;

said drive member having means for automatically adjusting the length of said drive member in response to said driving force of said electric power means in the position of said clamp member wherein said first converting means comprises:

a crank arm connected to said electric power means and extending radially outward for rotation about an axis of rotation;

a follower connected to said crank arm;

said drive member mounted for linear reciprocal movement along a fixed path, said drive member having a cam surface defining a slot, and said follower operably engageable within said slot for converting the rotational movement of said follower into linear movement of said drive member; and manual means for adjusting the stroke of said linear reciprocal motion of said drive member.

8. The power operated clamp as stated in claim 7, wherein said manual adjusting means comprises:

said crank arm having a plurality of apertures radially spaced from said axis of rotation; and said follower removably inserted in at least one of said apertures of said crank arm.

9. The power operated clamp as stated in claim 8, further comprising:

said drive member having an outer shaft and a threaded shaft wherein said outer shaft threadingly receives said threaded shaft for threadingly adjusting the length of said drive member in response to the position of said follower relative to said crank arm.

10. A power operated clamp comprising:

an electrical motor for imparting a rotational driving force;

a crank arm connected to said electrical motor and extending radially outward for rotation about an axis of rotation;

a follower connected to said crank arm;

said drive member mounted for linear reciprocal movement along a fixed path and having a cam surface defining a slot, and said follower operably engageable within said slot for converting the rotational movement of said follower into harmonic linear movement of said drive member;

a clamp member operably associated with said drive member for moving said clamp member between a clamped position and a released position;

means for automatically adjusting the length of said drive member in response to said driving force of said electric motor and the position of said clamp member; and manual means for adjusting the stroke of said linear reciprocal harmonic motion of said drive member.

11. The power operated clamp as stated in claim 10, wherein said automatic adjusting means comprises:

said drive member having an outer shaft and an inner shaft wherein said outer shaft telescopically receives said inner shaft for telescopic movement between an extended position and a contracted position;

a positive stop for limiting said telescopic movement of said drive member between said extended position and said contracted position; and at least one compression spring operably connected to said outer shaft and said inner shaft of said drive member, and said spring biasing said drive member toward said extended position.

12. The power operated clamp as stated in claim 11, wherein said positive stop comprises:

a pin connected to said inner shaft of said drive member; and a slot formed in said outer shaft of said drive member for receiving said pin wherein said extended and contracted positions are defined by said pin engaging the ends of said slot.

13. The power operated clamp as stated in claim 10, wherein said manual adjusting means comprises:

said crank arm having a plurality of apertures radially spaced from said axis of rotation; and said follower removably inserted in at least one of said apertures of said crank arm.

14. The power operated clamp as stated in claim 13, further comprising:

said drive member having an outer shaft and a threaded shaft wherein said outer shaft threadingly receives said threaded shaft for threadingly adjusting the length of said drive member in response to the position of the follower relative to the crank arm.

15. The power operated clamp as stated in claim 12, wherein said slot extends substantially normal to said fixed path.

16. The power operated clamp as stated in claim 12, wherein said slot is substantially linear.

17. The power operated clamp as state in claim 10, further comprising:

second converting means, connecting said clamp member to said drive member for converting said linear reciprocal harmonic motion of said drive member into rotary harmonic motion of said clamp member.

* * * * *